(12) United States Patent
Hobson

(10) Patent No.: US 10,872,713 B1
(45) Date of Patent: Dec. 22, 2020

(54) POWER CABLE SYSTEM WITH COOLING CAPABILITY

(71) Applicant: NKT HV Cables AB, Lyckeby (SE)

(72) Inventor: Robert Wayne Hobson, Holly Springs, NC (US)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 16/506,643

(22) Filed: Jul. 9, 2019

(51) Int. Cl.
    *H01B 7/42* (2006.01)
    *H02G 3/03* (2006.01)
    *F28D 7/00* (2006.01)

(52) U.S. Cl.
    CPC ............ *H01B 7/423* (2013.01); *F28D 7/00* (2013.01); *H02G 3/03* (2013.01)

(58) Field of Classification Search
    CPC .......... F28D 7/00; H02G 3/03; H02G 15/205; H02G 15/34; H01B 7/00; H01B 7/42; H01B 7/421; H01B 7/423; H01B 7/29; H01B 7/425; H01B 9/00; H01B 9/003; H01B 9/006; H01B 9/06–0694; H01B 12/16; B60L 53/302; H05K 7/20336; F25D 19/006
    USPC ....... 174/15.1, 15.5, 15.6, 16.1, 16.2, 125.1, 174/47; 505/163, 886
    See application file for complete search history.

(56) References Cited

U.S. PATENT DOCUMENTS

| | | | | |
|---|---|---|---|---|
| 2,398,447 A | * | 4/1946 | Peirce | H01B 9/0611 174/13 |
| 3,292,016 A | * | 12/1966 | Wilhelm | H01L 39/14 307/90 |
| 3,955,042 A | | 5/1976 | Kellow et al. | |
| 3,962,529 A | * | 6/1976 | Kubo | H01B 7/29 174/15.6 |
| 6,052,284 A | * | 4/2000 | Suga | H01L 23/473 361/699 |
| 9,000,295 B1 | * | 4/2015 | Graber | H02G 15/34 174/15.3 |
| 2007/0137881 A1 | * | 6/2007 | Ashibe | H01R 4/68 174/125.1 |

(Continued)

FOREIGN PATENT DOCUMENTS

| | | |
|---|---|---|
| DE | 2554650 B2 | 1/1978 |
| GB | 988030 A | 3/1965 |
| JP | 49132482 U | 11/1974 |

(Continued)

OTHER PUBLICATIONS

Extended European Search Report; Application No. EP 20 18 2942; Completed Oct. 30, 2020; 8 Pages.

Primary Examiner — Roshn K Varghese
(74) Attorney, Agent, or Firm — Whitmyer IP Group LLC

(57) ABSTRACT

A power cable system including a power cable, and an evaporator pipe assembly extending along the power cable, wherein the evaporator pipe assembly having an inner liquid pipe including a pressurised liquid refrigerant, and an outer gas pipe arranged outside of and coaxially with the inner liquid pipe, wherein the inner liquid pipe is provided with a plurality of openings distributed along its length, and wherein the openings provide fluid communication between the inner liquid pipe and the outer gas pipe, allowing part of the pressurised liquid refrigerant to escape from the inner liquid pipe to the outer gas pipe and evaporate in the outer gas pipe, thereby cooling the power cable.

21 Claims, 2 Drawing Sheets

(56) References Cited

U.S. PATENT DOCUMENTS

2007/0205009 A1\* 9/2007 Figenschou ........... F16L 11/127
　　　　　　　　　　　　　　　　　　　　　174/47

FOREIGN PATENT DOCUMENTS

| JP | 49147577 U | 12/1974 |
| JP | 49150649 U | 12/1974 |
| JP | 07024163 B2 | 3/1995 |

\* cited by examiner

POWER CABLE SYSTEM WITH COOLING CAPABILITY

TECHNICAL FIELD

The present disclosure generally relates to power cables, and in particular to power cable cooling.

BACKGROUND

A type of power cable system present in some regions of the world are often referred to as high pressure fluid filled (HPFF) cable systems, also known as pipe cables. HPFF cable systems typically include an outer pipe and one or more power cables arranged in the outer pipe. Typically, a high-pressure liquid such as oil is arranged in the outer pipe for squeezing gas bubbles in the cable insulation to a very small size and prevent the formation of partial discharge locations. The liquid also transfers heat from the power cable(s) to the outer pipe.

It would be desirable to increase the ampacity of power cables such as those of an HPFF cable system. The ampacity is related to the heat developed in the cable. The ampacity is limited by how fast the heat from the losses in the cable system is dissipated to the surrounding medium. By removing the heat from the pipe cable and not relying on the heat to dissipate through the surrounding medium, it would be possible to increase the ampacity. One way to cool a power cable is by circulating the fluid, typically oil or water, through the outer pipe. The fluid is circulated through air or water-cooled heat exchangers which are uniformly spaced apart along the transmission line. This method requires recirculation of the fluid. Often, existing underground cables do not have facilities to provide recirculation of fluid.

U.S. Pat. No. 3,955,042 discloses the cooling of power cables by a closed-cycle evaporation-condensation process. Cables are arranged in a pipe which is high pressure oil-filled. The pipe is enclosed by an outer pipe adapted to extend along a portion of a length of the underground cables and partially filled with volatile liquid. An enclosed heat chamber is connected to the outer pipe. The connection and the enclosed heat exchanger are located above a level of the volatile liquid within the outer pipe. The volatile liquid is evaporated within the outer pipe by heat generated within the power cables. The evaporated liquid is transferred by virtue of pressure differential from the outer pipe to the enclosed heat exchanger, wherein the evaporated volatile liquid is condensed and from which it flows by gravity back to the outer pipe.

A drawback with the solution disclosed in U.S. Pat. No. 3,955,042 is that the evaporated volatile liquid travels along the power cable and is thereby heated as it flows in the axial direction of the power cable. The cooling effect is hence reduced along the power cable.

SUMMARY

In view of the above, an object of the present disclosure is to provide a power cable system which solves or at least mitigates existing problems of the state of the art.

There is hence provided a power cable system comprising: a power cable, and an evaporator pipe assembly extending along the power cable, wherein the evaporator pipe assembly comprises an inner liquid pipe including a pressurised liquid refrigerant, and an outer gas pipe arranged outside of and coaxially with the inner liquid pipe, wherein the inner liquid pipe is provided with a plurality of openings distributed along its length, and wherein the openings provide fluid communication between the inner liquid pipe and the outer gas pipe, allowing part of the pressurised liquid refrigerant to escape from the inner liquid pipe to the outer gas pipe and evaporate in the outer gas pipe, thereby cooling the power cable.

The liquid refrigerant can evaporate in the outer gas pipe due to a lower pressure in the outer gas pipe compared to the pressure in the inner liquid pipe. The boiling point of the liquid refrigerant is hence lowered in the outer gas pipe.

The evaporator pipe assembly forms a long evaporator running parallel with the power cable. The openings operate in choked flow. The liquid refrigerant exits the openings at a lower pressure and temperature and at a fixed mass flow rate regardless of the operating pressure inside the inner liquid pipe into the outer gas pipe. The heat of evaporation absorbs and removes the heat. A more uniform cooling along the length of the power cable may thereby be achieved without recirculation. The cooling capability of the outer gas pipe is refreshed in a region of each opening. The axial distance between the openings may be adapted based on the cooling needs of the power cable.

The power cable may be a low voltage, medium voltage or high voltage power cable.

The cooling may further be controlled by controlling the pressure inside the outer gas pipe, because this pressure together with the characteristics of the refrigerant determines the boiling temperature of the refrigerant. Depending on the pressure in the outer gas pipe and the refrigerant selected, the boiling temperature could be as low as below zero degrees Celsius. The outer surface of the outer cooling pipe may hence be cooled to below zero degrees Celsius. Due to the more uniform cooling, the power cable system enables a higher ampacity of the power cable. In particular, a power cable of different type than HPFF cables will be able to operate with the same or similar ampacity as the existing HPFF cable systems. The power cable may for example have an insulation system comprising cross-linked polyethylene (XLPE), polypropylene or cellulose-based material such as paper.

The outer gas pipe may for example have an outer diameter in the range of 2-10 cm, such as 2-8 cm or 3-7 cm or 3-6 cm. Smaller dimensioned pipes may better withstand high internal pressures.

The power cable system may comprise a plurality of power cables, for example three power cables, extending parallel with each other.

According to one example, the evaporator pipe assembly is arranged in the power cable. The evaporator pipe assembly may be located in the centre of the cable, radially inside of the conductor. The conductor may hence have a hollow centre. The inner liquid pipe and the outer gas pipe could be connected to the outside world through a termination or cable joint.

According to one embodiment the liquid refrigerant is arranged to flow along the length of the evaporator pipe assembly.

According to one embodiment the evaporator pipe assembly extends along the entire or essentially the entire length of the power cable.

One embodiment comprises a compressor unit having a suction side and a discharge side, wherein the outer gas pipe is connected to the suction side and the inner liquid pipe is connected to the discharge side.

The compressor unit may comprise a condenser provided on the discharge side and connected to the inner liquid pipe.

According to one embodiment the power cable system comprises a plurality of compressor units, and the evaporator pipe assembly comprises a first Tee connection configured to connect the outer gas pipe to the suction side of several of the compressor units and a second Tee connection configured to connect the inner liquid pipe to the discharge side of several of the compressor units. Multiple compressor units are thereby able to draw the evaporated refrigerant from and feed liquid refrigerant into the evaporator pipe assembly. This provides mechanical redundancy.

The number of compressor units required may depend on the amount of heat that must be removed from the power cables and the amount of heat that each compressor unit can remove.

According to one embodiment the compressor unit is configured to compress the evaporated refrigerant to liquid state as the evaporated refrigerant passes through the compressor unit and discharge it on the discharge side to the inner liquid pipe.

According to one embodiment the compressor unit is configured to be controlled to change the suction in the outer gas pipe to provide the evaporator pipe assembly with a controllable cooling functionality. Thus, based on the suction provided by the compressor unit, the cooling effect on the power cable may be controlled.

According to one embodiment the inner liquid pipe and the outer gas pipe are made of metal. The metal may for example comprise steel, such as stainless steel, copper, aluminium, an alloy based on steel, copper or aluminium, or any other suitable metal.

One embodiment comprises an outer pipe, wherein the power cable and the evaporator pipe assembly are arranged in the outer pipe.

According to one embodiment the liquid refrigerant is carbon dioxide.

Carbon dioxide, which has refrigerant designation number R744, has proved to be especially useful for certain high voltage applications. Other refrigerants or fluids may however alternatively also be used.

According to one embodiment the outer pipe is filled with a fluid. The heat transfer between the power cable and the evaporator pipe assembly may thereby be facilitated.

According to one embodiment the fluid is a liquid. Liquid provides a more efficient heat transfer than gas. The liquid does not remove the heat from the power cable but transports the heat from the outer surface of the power cable to the outer surface of the outer gas pipe.

According to one embodiment the liquid is water. The liquid could alternatively be any other suitable liquid, such as an oil.

One embodiment comprises a first liquid tank, and a liquid movement system configured to move the liquid from the first liquid tank and back to the first liquid tank through the outer pipe.

According to one example the power cable system comprises a second liquid tank, wherein the first liquid tank is arranged at a first end region of the power cable and the second liquid tank is arranged at a second end region of the power cable, wherein the liquid movement system is configured to alternatingly move the liquid between the first liquid tank and the second liquid tank through the outer pipe.

According to one embodiment the liquid movement system is configured to move the liquid with turbulent flow through the outer pipe. Due to the turbulent flow, the heat exchange between the power cable and the evaporator pipe assembly is made more efficient. The turbulent flow makes the liquid temperature uniform in the cross section of the outer pipe. It is therefore not necessary with much liquid storage, for example only around an amount corresponding to 30-50 meters of outer pipe length.

According to one embodiment the liquid movement system comprises at least one pump.

The liquid movement system may according to one example comprise a bladder tank configured to act as liquid storage. The at least one pump may be configured to pump liquid from the bladder tank through the outer pipe and to be set in reverse to send the liquid back towards the bladder tank.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
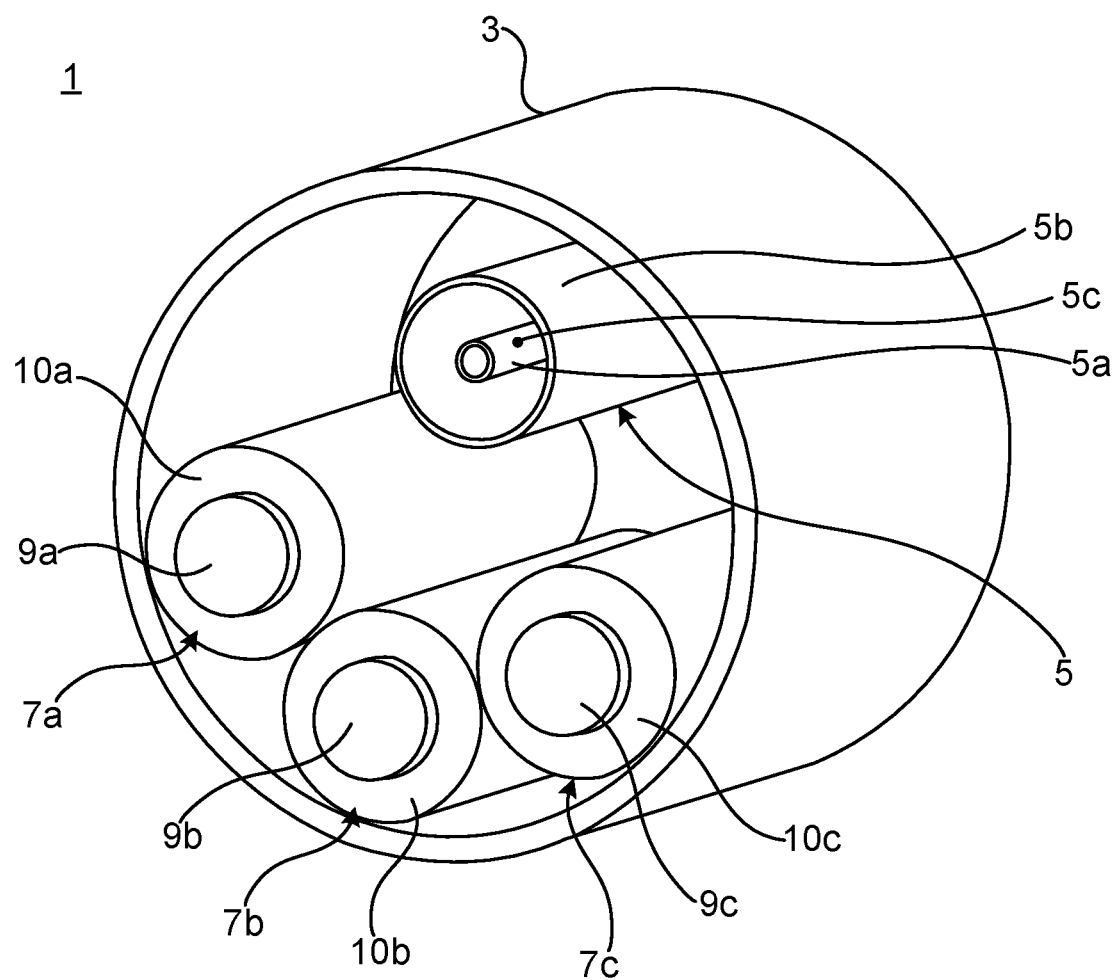
FIG. 1 is a perspective view of a cross section of a section of an example of a power cable system.

FIG. 1 shows an example of a power cable system 1. The power cable system 1 comprises an outer pipe 3 and an evaporator pipe assembly 5. The power cable system 1 furthermore comprises a plurality of power cables 7a-7c. The power cable system 1 could alternatively comprise only a single power cable. Further, it is to be noted that according to some examples the power cable system does not comprise any outer pipe 3.

The outer pipe 3 may for example be made of metal. The metal may for example be steel, such as stainless steel, aluminium, copper, or any other metal material suitable for pipe construction. The outer pipe 3 could alternatively be made of another material than metal, for example a polymeric material.

Each power cables 7a-7c comprises a respective conductor 9a, 9b, 9c and a respective insulation system 10a, 10b, 10c surrounding the conductor 9a, 9b, 9c. The insulation system 10a, 10b, 10c may for example comprise XLPE, polypropylene or cellulose material such as paper. In the case of only one power cable, the power cable comprises a conductor and an insulation system surrounding the conductor. The insulation system may in this case for example comprise XLPE, polypropylene or cellulose material such as paper. In the present example, the power cables 7a-7c are arranged in the outer pipe 3. The power cables 7a-7c extend along the outer pipe 3 inside the outer pipe 3.

The evaporator pipe assembly 5 is arranged in the outer pipe 3. The evaporator pipe assembly 5 extends along the outer pipe 3 inside the outer pipe 3. The evaporator pipe assembly 5 extends along the power cables 7a-7c. The evaporator pipe assembly 5 may extend along a majority of the length of the power cables 7a-7c, for example along their entire length or essentially along their entire length.

In examples which do not comprise an outer pipe, the evaporator pipe assembly extends along the one or more power cables but without protection from an outer pipe.

The evaporator pipe assembly 5 comprises an inner liquid pipe 5a and an outer gas pipe 5b. The outer gas pipe 5b is arranged radially outside of and coaxially with the inner liquid pipe 5a. The inner gas pipe 5a may for example be made of metal. The metal may for example be steel such as stainless steel, copper or aluminium. The outer gas pipe 5b may for example be made of metal. The metal may for example be steel such as stainless steel, copper or aluminium.

The inner liquid pipe 5a comprises a plurality of openings or orifices 5c. The openings 5c are through-openings extending radially through the inner liquid pipe 5a. The openings 5c are distributed along the length of the inner liquid pipe 5a. The openings 5c provide fluid communication between the inner liquid pipe 5a and the outer gas pipe 5b.

The inner liquid pipe 5a contains a pressurised liquid refrigerant. The liquid refrigerant may for example be carbon dioxide, $CO_2$. In case of carbon dioxide, the carbon dioxide could be pressurised to at least 25 bar, such as at least 30 bar inside the inner liquid pipe 5a. Other liquid refrigerants are also envisaged, in particular any refrigerant that by way of a pressure drop provides reduced temperature at the lower pressure and can remove heat from the walls of the outer gas pipe 5b.

The liquid refrigerant is set to flow through the inner liquid pipe 5a. When the liquid refrigerant reaches an opening 5c, part of the liquid refrigerant escapes from the inner liquid pipe 5a through the opening 5c to the outer gas pipe 5b. The liquid refrigerant escaping through the opening 5c will then be subjected to an adiabatic expansion, in which it still in liquid form but colder than in the inner liquid pipe 5a. The pressure of the liquid refrigerant in the outer gas pipe 5b is typically several times lower than inside the inner liquid pipe 5a. The refrigerant is selected such that at the pressure in the outer gas pipe 5b, the boiling point of the liquid refrigerant is very low. For carbon dioxide, the boiling point could for example be below zero degrees Celsius. As the liquid refrigerant in the outer gas pipe 5b evaporates, the phase change consumes large amounts of heat emitted by the power cables 7a-7c. The outer surface of the outer gas pipe 5b obtains the temperature of the boiling point of the liquid refrigerant contained in the outer gas pipe 5b. The power cables 7a-7c are hence cooled.

According to one example, the power cable system 1 may comprise a fluid such as a liquid arranged inside the outer pipe 3 but outside of the evaporator pipe assembly 5. The liquid may fill or essentially fill the available space inside the outer pipe 3. The liquid may for example be water but could alternatively be an oil or any other liquid with relatively low viscosity. The liquid may be set to move with a turbulent flow inside the outer pipe 3 along the outer pipe 3.

Figure 2:
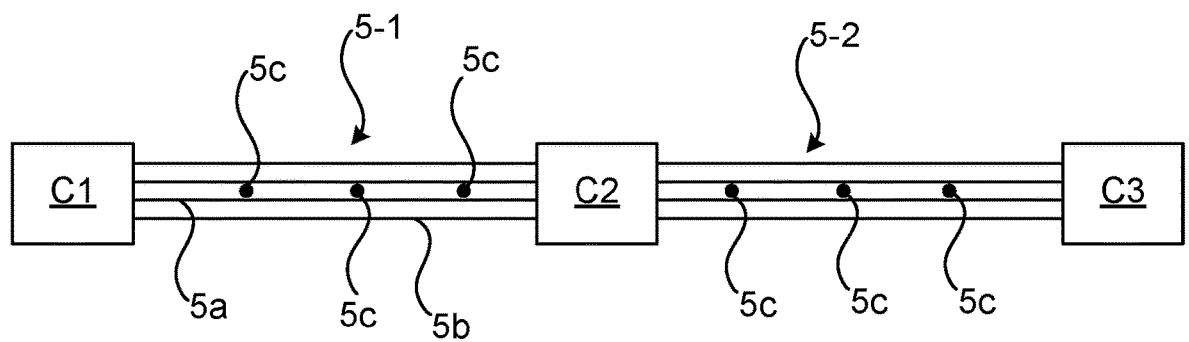
FIG. 2 schematically shows a side view of an example of a power cable system.

FIG. 2 schematically shows a side view of the power cable system 1 provided with further system components. The exemplified power cable system 1 comprises a plurality of compressor units C1-C3. Each compressor unit C1-C3 has a suction side and a discharge side. Each compressor unit C1-C3 may comprise a compressor, a condenser, and an accumulator tank for the liquid refrigerant.

For reasons of simplicity, the outer pipe 3 and the power cables 7a-7c are not shown in FIG. 2. The evaporator pipe assembly 5 is shown connected to the compressor units C1-C3.

A first section 5-1 of the evaporator pipe assembly 5 is connected to a first compressor unit C1 at one end and to a second compressor unit C2 at the other end. The inner liquid pipe 5a has one end connected to the discharge side of the first compressor unit C1 and the other end connected to the discharge side of the second compressor unit C2. The outer gas pipe 5b is connected to the suction side of the first compressor unit C1 and to the suction side of the second compressor unit C2.

Although both sides of the outer gas pipe 5b of the first section 5-1 of the evaporator pipe assembly 5 are connected to the suction side and both sides of the inner liquid pipe 5a are connected to the discharge side, the pressure drop over the first section 5-1 should be sufficient to drive the liquid refrigerant and evaporated refrigerant in the evaporator pipe assembly 5. The liquid refrigerant is thereby able to move back and forth between adjacent compressor units inside the evaporator pipe unit 5.

According to one example, the first compressor unit C1 and the second compressor unit C2 may be configured to be controlled such that a pressure difference is obtained between their suction sides and between their discharge sides to enable the evaporated refrigerant and the liquid refrigerant to flow between the first compressor unit C1 and the second compressor unit C2.

A second section 5-2 of the evaporator pipe assembly 5 is connected to the second compressor unit C2 at one end and to a third compressor unit C3 at the other end. The inner liquid pipe 5a has one end connected to the discharge side of the second compressor unit C2 and the other end connected to the discharge side of the third compressor unit C3. The outer gas pipe 5b is connected to the suction side of the second compressor unit C2 and to the suction side of the third compressor unit C3.

According to one example, the second compressor unit C2 and the third compressor unit C3 may be configured to be controlled such that a pressure difference is obtained between their suction sides and between their discharge sides to enable the evaporated refrigerant and the liquid refrigerant to flow between the second compressor unit 2 and the third compressor unit C3.

In view of the above, the power cable system may comprise a control system. The control system may be configured to control the suction of the compressor units C1-C3 to change the pressure in the outer gas pipe 5b. The pressure in the outer gas pipe 5b may thereby be controlled. Hence, the boiling point of the liquid refrigerant may be controlled.

The distance between two adjacent compressor units such as the first compressor unit C1 and the second compressor unit C2 may for example be a few hundred metres such as at least 300 meters, for example at least 500 metres, or at least 700 metres. Typically, the distance between two adjacent compressor units may be less than 2000 metres, for example less than 1500 metres. The compressor units C1-C3 may be located at splice pits accessible by manholes.

The accumulation tanks of the compressor units C1-C3 may comprising liquid refrigerant. The liquid refrigerant may be stored in the accumulation tank under high pressure. The pressure may for example be several times higher than the pressure of the liquid refrigerant in the inner liquid pipe 5a. The compressor units C1-C3 could thereby be able to cycle and store the liquid refrigerant. The power cable system 1 may comprise a control system configured to control one or more valves to control the amount of liquid refrigerant in the inner liquid pipe 5a provided from the liquid tank. The control system could be configured to control the one or more valves based on the temperature of the power cable(s). The power cable system 1 may for example comprise a plurality of temperature sensors for example in the form of a distributed temperature sensing system configured to measure the temperature of the power cable(s), fed to the control system.

Figure 3:
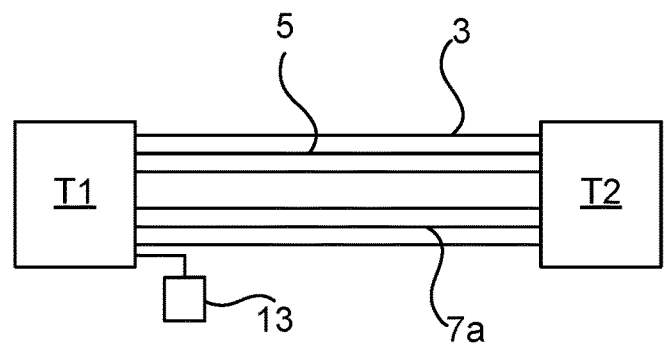
FIG. 3 schematically shows a side view of an example of a power cable system.

FIG. 3 schematically shows a side view of an example of the power cable system 1. The power cable system 1 depicted in FIG. 3 may comprise one or more compressor units as shown in FIG. 2 but are for reasons of simplicity not included in FIG. 3. The power cable system 1 comprises a first liquid tank T1 and a second liquid tank T2. The power cable system 1 comprises a liquid movement system 13. The liquid movement system 13 may comprise one or more pumps. The liquid movement system 13 is configured to move the liquid in the outer pipe 3 between the first liquid tank T1 and the second liquid tank T2. The liquid movement system 13 may be configured to move the liquid with a turbulent flow through the outer pipe 3 between the first liquid tank T1 and the second liquid tank T2. The first liquid tank T1 may for example be arranged at a first end of the outer pipe 3. The second liquid tank T2 may for example be arranged at a second end of the outer pipe 3.

As an alternative to the above, the power cable system 1 could comprise only a single liquid tank, e.g. the first liquid tank T1. In this case first liquid tank T1 should be placed appropriately along the length of the outer pipe 3. The liquid movement system 13 would in this case be configured to pump liquid from the first liquid tank T1 through the outer pipe 3 and back to the first liquid tank T1.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable system comprising:
   a power cable, and
   an evaporator pipe assembly arranged external to the power cable and extending along the power cable,
   wherein the evaporator pipe assembly comprises an inner liquid pipe including a pressurised liquid refrigerant, and an outer gas pipe arranged outside of and coaxially with the inner liquid pipe,
   wherein the inner liquid pipe is provided with a plurality of openings distributed along its length, and wherein the openings provide fluid communication between the inner liquid pipe and the outer gas pipe, allowing part of the pressurised liquid refrigerant to escape from the inner liquid pipe to the outer gas pipe and evaporate in the outer gas pipe, thereby cooling the power cable.

2. The power cable system as claimed in claim 1, wherein the liquid refrigerant is arranged to flow along the length of the evaporator pipe assembly.

3. The power cable system as claimed in claim 2, wherein the evaporator pipe assembly extends along the entire or essentially the entire length of the power cable.

4. The power cable system as claimed in claim 2, further comprising:
   a compressor unit having a suction side and a discharge side, wherein the outer gas pipe is connected to the suction side and the inner liquid pipe is connected to the discharge side.

5. The power cable system as claimed in claim 2, wherein the inner liquid pipe and the outer gas pipe are made of metal.

6. The power cable system as claimed in claim 1, wherein the evaporator pipe assembly extends along the entire or essentially the entire length of the power cable.

7. The power cable system as claimed in claim 1, further comprising:
   a compressor unit having a suction side and a discharge side, wherein the outer gas pipe is connected to the suction side and the inner liquid pipe is connected to the discharge side.

8. The power cable system as claimed in claim 7, wherein the compressor unit is configured to compress the evaporated refrigerant to liquid state as the evaporated refrigerant passes through the compressor unit and discharge it on the discharge side to the inner liquid pipe.

9. The power cable system as claimed in claim 8, wherein the compressor unit is configured to be controlled to change the suction in the outer gas pipe to provide the evaporator pipe assembly with a controllable cooling functionality.

10. The power cable system as claimed in claim 7, wherein the compressor unit is configured to be controlled to change the suction in the outer gas pipe to provide the evaporator pipe assembly with a controllable cooling functionality.

11. The power cable system as claimed in claim 1, wherein the inner liquid pipe and the outer gas pipe are made of metal.

12. The power cable system as claimed in claim 1, comprising an outer pipe, wherein the power cable and the evaporator pipe assembly are arranged in the outer pipe.

13. The power cable system as claimed in claim 1, wherein the liquid refrigerant is carbon dioxide.

14. The power cable system as claimed in claim 1, wherein the outer pipe is filled with a fluid.

15. The power cable system as claimed in claim 14, wherein the fluid is a liquid.

16. The power cable system as claimed in claim 15, wherein the liquid is water.

17. The power cable system as claimed in claim 16, comprising a first liquid tank, and a liquid movement system configured to move the liquid from the first liquid tank and back to the first liquid tank through the outer pipe.

18. The power cable system as claimed in claim 15, comprising a first liquid tank, and a liquid movement system configured to move the liquid from the first liquid tank and back to the first liquid tank through the outer pipe.

19. The power cable system as claimed in claim 18, wherein the liquid movement system is configured to move the liquid with turbulent flow through the outer pipe.

20. The power cable system as claimed in claim 18, wherein the liquid movement system comprises at least one pump.

21. The power cable system as claimed in claim 1, wherein the power cable is spaced apart from the evaporator pipe assembly.

* * * * *